United States Patent [19]

Kajimoto et al.

[11] Patent Number: 5,568,199
[45] Date of Patent: Oct. 22, 1996

[54] DIGITAL VIDEO SIGNAL CODE SIZE CONTROL APPARATUS

[75] Inventors: Kazuo Kajimoto, Neyagawa; Kinya Kanno, Katano; Rumi Tsubota, Hirakata, all of Japan

[73] Assignee: Matsushita Electric Industrial Co., Ltd., Osaka, Japan

[21] Appl. No.: 157,643

[22] Filed: Nov. 24, 1993

[30] Foreign Application Priority Data

Nov. 25, 1992 [JP] Japan .................................. 4-314821

[51] Int. Cl.$^6$ .................................................. H04N 7/12
[52] U.S. Cl. .......................... 348/390; 348/390; 348/397; 348/415; 348/406; 348/402
[58] Field of Search .................................. 348/390, 391, 348/392, 393, 394, 397, 398, 412, 413, 405, 406, 407, 408

[56] References Cited

U.S. PATENT DOCUMENTS

| 4,943,855 | 7/1990 | Bheda et al. | 348/397 |
|---|---|---|---|
| 5,048,111 | 9/1991 | Jones et al. | 348/397 |
| 5,072,295 | 12/1991 | Murakami et al. | 348/390 |
| 5,089,889 | 2/1992 | Sugiyama | 348/398 |
| 5,097,330 | 3/1992 | Guichard et al. | 348/398 |
| 5,128,754 | 7/1992 | Dhein | 348/398 |
| 5,136,375 | 8/1992 | Citta et al. | 348/394 |
| 5,146,324 | 9/1992 | Miller et al. | 348/405 |
| 5,214,507 | 5/1993 | Aravind et al. | 348/391 |
| 5,223,926 | 6/1993 | Stone et al. | 348/390 |
| 5,241,381 | 8/1993 | Kondo | 348/392 |
| 5,241,401 | 8/1993 | Fujiwara et al. | 348/391 |
| 5,253,041 | 10/1993 | Wine et al. | 348/421 |
| 5,260,781 | 11/1993 | Soloff et al. | 348/398 |
| 5,299,019 | 3/1994 | Pack et al. | 348/405 |
| 5,434,623 | 7/1995 | Coleman et al. | 348/405 |

FOREIGN PATENT DOCUMENTS

| 0480353 | 4/1992 | European Pat. Off. . |
| 3940554 | 6/1990 | Germany . |

OTHER PUBLICATIONS

European Search Report (93118793.4) dated Aug. 24, 1994.
James Arvo, *Graphics Gems II*, pp. 53–56.
C. Wallace, et al., "Draft (Revision 6) of the JPEG Algorithm" pp. 1–124 (Jun. 1990).

*Primary Examiner*—Tommy P. Chin
*Assistant Examiner*—Anand S. Rao
*Attorney, Agent, or Firm*—Ratner & Prestia

[57] ABSTRACT

A video signal of one field is applied to a high frequency component measuring device which measures the high frequency component strength Q of the image of the video signal. The video signal of one field is also applied to a field memory. A look-up table memory carries a plurality of quantization tables each containing parameters. The parameters are aligned in a matrix format in the quantization table. The strength Q is used for selecting one quantization table which is appropriate for reducing the size of coded video signal. A JPEG compression device compresses the video signal from the field memory by DCT operation to produce compressed signal, which is an alignment of a plurality of coefficients aligned in a matrix format. The coefficients are divided by corresponding parameters in the selected quantization table to reduce the size of the compressed signal.

6 Claims, 10 Drawing Sheets

Fig.4

| $Q/2^{15}$ | QUANTIZATION TABLE |
|---|---|
| 0 | ⋮ |
| 1 | |
| ⋮ | |
| 40 | 16 11 11 16 24 40 51 61 ← 401<br>12 12 14 19 26 58 60 55<br>14 13 16 24 40 57 69 56<br>14 17 22 29 51 87 80 62<br>18 22 37 56 68 109 103 77<br>24 35 55 64 81 104 113 92<br>49 64 78 87 103 121 120 101<br>72 92 95 98 112 100 103 99 |
| ⋮ | ⋮ |
| 96 | 32 22 22 32 48 80 102 122 ← 402<br>24 24 28 38 52 116 120 110<br>28 26 32 48 80 114 138 112<br>28 34 44 58 102 174 160 124<br>36 44 74 112 136 218 206 154<br>48 70 110 128 162 208 226 184<br>98 128 156 174 206 242 240 202<br>144 184 190 196 224 200 206 198 |
| ⋮ | ⋮ |

LUT MEMORY 722

QUANTIZATION TABLE (4KByte) — 901

| 22 | 15 | 15 | 22 | 33 | 56 | 71 | 85 |
|---|---|---|---|---|---|---|---|
| 16 | 16 | 19 | 26 | 36 | 81 | 84 | 77 |
| 19 | 18 | 22 | 33 | 56 | 79 | 96 | 78 |
| 19 | 23 | 30 | 40 | 71 | 121 | 112 | 86 |
| 25 | 30 | 51 | 78 | 95 | 152 | 144 | 107 |
| 33 | 49 | 77 | 89 | 113 | 145 | 158 | 128 |
| 68 | 89 | 109 | 121 | 144 | 169 | 168 | 141 |
| 100 | 128 | 133 | 137 | 156 | 140 | 144 | 138 |

— 903

| 38 | 26 | 26 | 38 | 57 | 96 | 122 | 146 |
|---|---|---|---|---|---|---|---|
| 28 | 28 | 33 | 45 | 62 | 139 | 144 | 132 |
| 33 | 31 | 38 | 57 | 96 | 136 | 165 | 134 |
| 33 | 40 | 52 | 69 | 122 | 208 | 192 | 148 |
| 43 | 52 | 88 | 134 | 153 | 261 | 247 | 184 |
| 57 | 84 | 132 | 153 | 194 | 249 | 271 | 220 |
| 117 | 153 | 187 | 208 | 247 | 255 | 255 | 242 |
| 172 | 220 | 228 | 235 | 240 | 247 | 240 | 237 |

5KByte — 902

| 16 | 11 | 11 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

— 904

| 32 | 22 | 22 | 32 | 48 | 80 | 102 | 122 |
|---|---|---|---|---|---|---|---|
| 24 | 24 | 28 | 38 | 52 | 116 | 120 | 110 |
| 28 | 26 | 32 | 48 | 80 | 114 | 138 | 112 |
| 28 | 34 | 44 | 58 | 102 | 174 | 160 | 124 |
| 36 | 44 | 74 | 112 | 136 | 218 | 206 | 154 |
| 48 | 70 | 110 | 128 | 162 | 208 | 226 | 184 |
| 98 | 128 | 156 | 174 | 206 | 242 | 240 | 202 |
| 144 | 184 | 190 | 196 | 224 | 200 | 206 | 198 |

| Q | |
|---|---|
| 0 | |
| 1 | 40 |
| ... | 96 |

| 16 | 11 | 11 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

DIGITAL VIDEO SIGNAL CODE SIZE CONTROL APPARATUS

BACKGROUND OF THE INVENTION

1. Field of the Invention

The present invention relates to a digital video signal code size control apparatus used for video editing and transmission using a medium storing the video in a digital format.

2. Description of the Prior Art

With recent advances in video coding technologies, it has become possible to efficiently encode and compress video image signals using selected characteristics of human visual perception. For example, the JPEG (Joint Photographic Experts Group) compression method can compress image signal to approximately 1/20 the size of the source image signal with minimal visually-perceptible deterioration.

With highly efficiently compression methods such as this, however, the data quantity after encoding, i.e., the encoded data size, varies with the image being encoded. A digital video signal code size control apparatus controls the encoding operation so that the encoded data can be stored within a fixed block size. A block diagram of this conventional digital video signal code size control apparatus is shown in FIG. 10.

This conventional digital video signal code size control apparatus comprises an image memory 1001 storing the source image signal, a JPEG compression device 1002 handling the actual data compression, a standard look-up table memory 1003 storing the standard quantization table (specific example of which is shown in FIG. 11), a coefficient memory 1004 for storing the real number multiplied by each element of the standard quantization table shown in FIG. 11, a default value memory 1006 storing the default value "1" of the coefficient memory 1004, a coding size comparator 1007 for comparing the code size resulting from compression by the JPEG compression device 1002 with the predetermined target block size, an addend memory 1008 storing the constant "1", an adder 1009 adding the value fetched from the addend memory 1008 to the value stored in the coefficient memory 1004, a selector switch 1010, and an output switch 1011.

The data compression algorithm of the JPEG compression device 1002 is described under "DCT (discrete cosine transformation) based systems" in the "Draft (Revision 6) of the JPEG algorithm" (ISO/IEC, JTC1/SC2/WG8) of Jun. 24, 1990. The parameters stored in the standard quantization table memory 1003 are multiplied by the value in the coefficient memory 1004 by the multiplier 1005, and the products are output to the JPEG compression device 1002 as the revised quantization table value.

The selector switch 1010 operates as follows. When the image is input to the image memory 1001, the selector switch 1010 selects the default value memory 1006 input. When the coding size comparator 1007 determines that the size of the coded data output by the JPEG compression device 1002 is greater than the target block size, the selector switch 1010 selects the adder 1009 input. At all other times, the selector switch 1010 switches OFF so that the value stored in the coefficient memory 1004 does not change.

The output switch 1011 outputs the compression result only when the coding size comparator 1007 determines that the size of the encoded data output by the JPEG compression device 1002 does not exceed the target block size.

The operation of the conventional digital video signal code size control apparatus shown in FIG. 10 is described below.

The images are temporarily accumulated in the image memory 1001, at which time the selector switch 1010 selects the default value memory 1006 to set a value of "1" in the coefficient memory 1004. The quantization table values shown in the standard quantization table in FIG. 11 are obtained because each of the elements in the standard quantization table memory 1003 is multiplied by the value "1" from the coefficient memory 1004, and these quantization table values are used by the JPEG compression device 1002 to compress the image in the image memory 1001. The compressed code size is then compared by the code size comparator 1007 with the predetermined target block size, and if the compressed code size is greater than the target block size, the coding size comparator 1007 sets the selector switch 1010 to the adder 1009 side. The value of the addend memory 1008 is therefore added to the value from the coefficient memory 1004, resulting in a new coefficient of 2. The quantization table data is thus rewritten, doubling each of the parameters in the standard quantization table. These new parameters are then used by the JPEG compression device 1002 to re-compress the image in the image memory 1001. This sequence of operations is repeated until the coding size comparator 1007 determines that the compression result does not exceed the target block size.

When the coding size comparator 1007 determines that the compression result does not exceed the target block size, output switch 1011 becomes ON (continuous to the JPEG compression device 1002 output), and the compression result is output.

The conventional digital video signal code size control apparatus will thus always output a compressed image smaller than the predetermined target block size.

Because this conventional digital video signal code size control apparatus encodes the source data and then compares the result with the fixed block size, the number of loops required for the coding result to equal the fixed block size cannot be predicted, and the time required to compress and encode a single image cannot be predetermined.

As a result, real-time coding to within a predetermined fixed block size is not possible when inputting rapidly moving digitized images, such as NTSC or PAL format television broadcast images with 60 or 50 fields per second, to a conventional digital video signal code size control apparatus as described above.

SUMMARY OF THE INVENTION

Therefore, an object of the present invention is to provide a digital video signal code size control apparatus for encoding even NTSC and PAL format video images in real-time to a fixed block size.

According to the present invention, a digital video signal code size control apparatus for encoding a video signal comprises: field memory means for storing at least a field of said video signal; high frequency component measuring means for measuring a high frequency component strength Q of an image carried in said video signal; parameter generation means for generating selected parameters based on said high frequency component strength Q; and coding means for encoding said video signal in said field memory means using said selected parameters to generate coded video signal of one field within a preselected data length.

BRIEF DESCRIPTION OF THE DRAWINGS

The present invention will become more fully understood from the detailed description given below and the accompanying diagrams wherein:

FIG. 4 is a diagram showing sample contents of the look-up table memory shown in FIG. 1, FIG. 9 is a diagram showing sample contents of the look-up table memory show in FIG. 7.

DESCRIPTION OF PREFERRED EMBODIMENTS

The first embodiment of a digital video signal code size control apparatus according to the present invention is described below with reference to FIG. 1.

Figure 1:
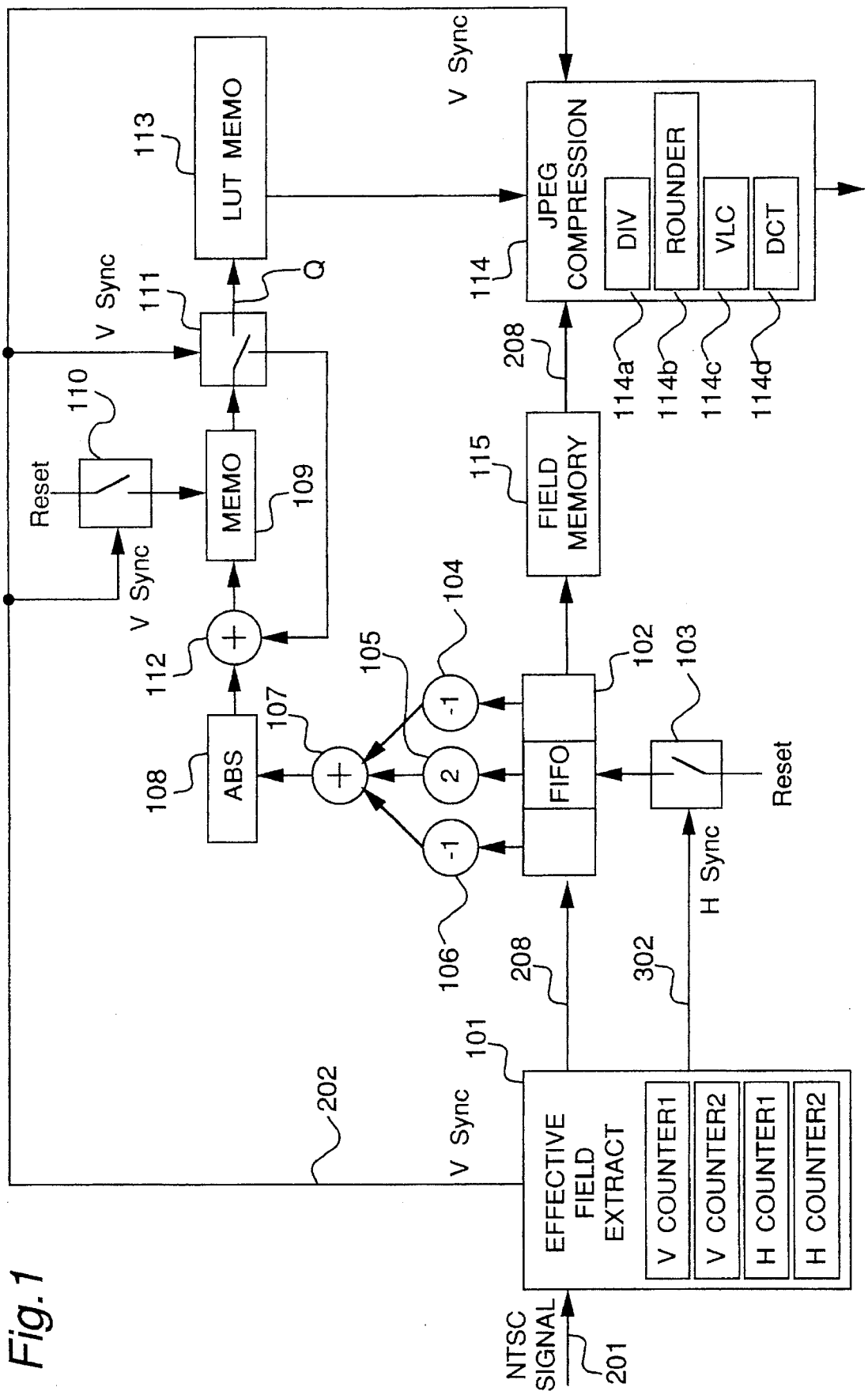
FIG. 1 is a block diagram of the digital video signal code size control apparatus according to the first embodiment of the present invention, FIG. 2 are wave forms for describing the operation of the effective field extractor shown in FIG. 1 based on the vertical synchronization signal, FIG. 3 are wave forms showing details of a portion shown in FIG. 2.

Referring to FIG. 1, an effective field extractor 101 receives an NTSC input signal 201 containing a video data and extracts an effective field video signal 208, a vertical synchronization signal 202, and the horizontal synchronization signal 302. This operation will be described in detail below in connection with FIGS. 2 and 3.

Figure 2:
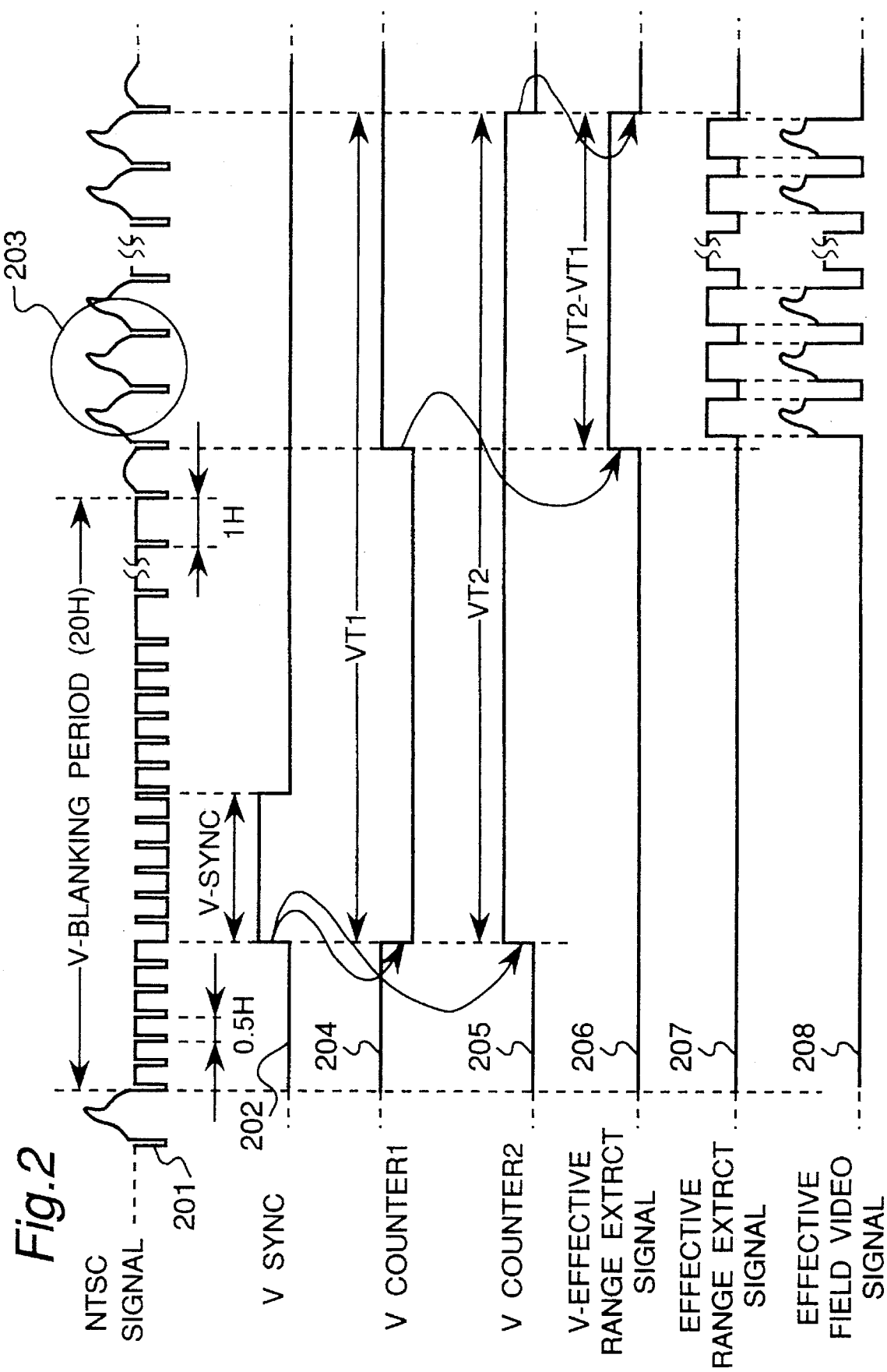

Referring to FIG. 2, the effective field extractor 101 detects the vertical synchronization pulse in three horizontal scanning periods during the vertical blanking period of the NTSC input signal 201 and outputs the vertical synchronization signal 202 as a HIGH level signal during this period and a LOW level signal in all other periods.

Figure 3:
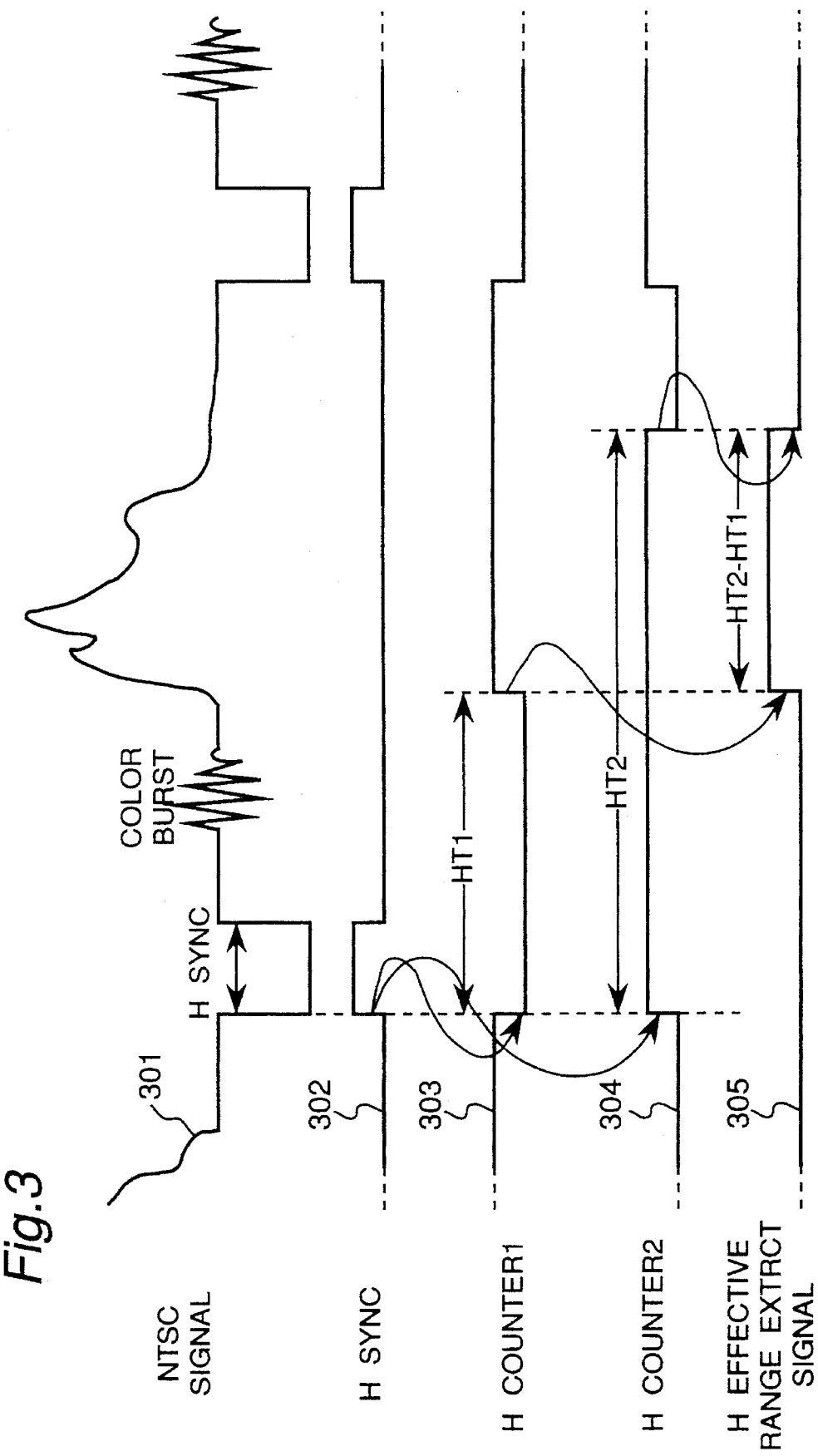

Referring to FIG. 3, a portion of the NTSC input signal 201 particularly at circle 203 in FIG. 2 is shown in enlarged scale. The effective field extractor 101 detects the horizontal synchronization pulse, and generates the horizontal synchronization signal 302, which is a HIGH level signal during this period and a LOW level signal in all other periods. H counter 1 and H counter 2 begin counting the dot clock in response to the rising edge of the horizontal synchronization signal 302. The H counter 1 produces an output 303 which is a LOW level at the rising edge of the horizontal synchronization signal 302, and becomes HIGH level after a period HT1. The H counter 2 produces an output 304 which is a HIGH level at the rising edge of the horizontal synchronization signal 302, and becomes LOW level after a period HT2. The horizontal effective range extraction signal 305, which rises at period H1 after the rising edge of the horizontal synchronization signal 302, remains in HIGH level for the period (HT2–HT1), and then drops to a LOW level, is obtained by performing an AND operation on the H counter 1 output 303 and H counter 2 output 304. If the dot clock is 14.3 MHz, HT1=200, and HT2=839, there will be 640 pixels, not including the color burst signal, contained in the horizontal effective range extraction signal 305 in each scanning line in the horizontal direction.

Referring again to FIG. 2, V counter 1 and V counter 2 begin counting the rising edges of the horizontal synchronization signal 302 at the rising edge of the vertical synchronization signal 202. The V counter 1 output 204 is LOW at the rising edge of the vertical synchronization signal 202, and becomes HIGH after a period VT1. The V counter 2 output 205 is HIGH at the rising edge of the vertical synchronization signal 202, and becomes LOW after a period VT2. The vertical effective range extraction signal 206, which rises at period VT1 after the rising edge of the vertical synchronization signal 202, remains HIGH for the period (VT2–VT1), and then drops to LOW, is obtained by performing an AND operation on the V counter 1 output 204 and V counter 2 output 205. If VT1=18 and VT2=257, there will be 240 vertical scanning lines containing in the vertical effective range extraction signal 206 not including the blanking period.

The effective range extraction signal 207 is obtained by performing an AND operation on the horizontal effective range extraction signal 305 and the vertical effective range extraction signal 206. The effective field video signal 208 of the extracted area actually containing the image signal is obtained by passing through the NTSC input signal 201 only when the effective range extraction signal 207 is HIGH, and not passing the NTSC input signal 201 when the effective range extraction signal 207 value is not HIGH. Note that one field in the effective field video signal 208 comprises 240 lines/field at 640 dots/line. Note also that each pixel comprises the luminance element only, and is expressed by eight bits.

The effective field video signal is then input to FIFO (first-in first-out) memory 102 having three areas to store three pixel data. The reset switch 103 resets (is ON) when the horizontal synchronization signal 302 is HIGH to clear the FIFO memory 102. The FIFO memory 102 temporarily stores three consecutive pixels from the effective field video signal 208 for each scanning line. Each of the three pixel values in the FIFO memory 102 is multiplied by coefficients "−1", "2" and "−1", respectively, generated by coefficient generators 104, 105 and 106, and the products are summed by an adder 107. The absolute value of the adder 107 output is then obtained by the absolute value extractor 108 and applied to an adder 112 for accumulation in a cumulative memory 109. The value of the cumulative memory 109 is cleared to zero by a reset switch 110 at rising edge of the vertical synchronization signal 202. A selector switch 111 switches to the look-up table memory 113 when the vertical synchronization signal 202 is HIGH, and switches to the adder 112 at all other times.

Because the selector switch 111 is normally switched to the adder 112, the output of the absolute value extractor 108 is continuously added to the value in the cumulative memory 109. When adding ends for one field, the selector switch 111 switches to the look-up table memory 113 carrying a plurality of quantization tables for the data quantization.

Note that the absolute value extractor 108 output increases as the difference between the three pixels stored in the FIFO memory 102 increases. The cumulative memory 109 output obtained by accumulating these values increases as the pixel change across one complete field increases, i.e., as the high frequency component of the spatial frequency increases, and decreases as the luminance values across the one field become flatter, i.e., as the high frequency component of the spatial frequency decreases. In other words, when the picture of the field is simple, such as a plain white image, the output from the cumulative memory 109 is relatively low, but when the picture of the field is complicated or has many changes in color and figures, such as a checkered board image with small squares with different colors, the output from the cumulative memory 109 is relatively high. The value output from the cumulative memory 109 therefore expresses the strength of the high frequency component in the field; this value is referred to as a "high frequency component strength Q". By the use of strength Q, as produced from switch 111 at the end of each field, a look-up table is selected from a plurality of look-up tables stored in the look-up table memory 113. The selected look-up table is applied to a JPEG compression device 114.

The contents of the look-up table memory 113 are shown in FIG. 4. The tables in FIG. 4 show the relationship between the quantization table data F used by JPEG compression device 114 and the high frequency component strength Q when the data compression per field is reduced to less than 20 kB. Before selecting a quantization table from the look-up table memory 113, the high frequency component strength Q is first divided by $2^{15}$. If the result is 40, a quantization table 401 is selected and is output to the JPEG compression device 114. If the result of dividing the high frequency component strength Q by $2^{15}$ is 96, a quantization table 402 is selected and is output to the JPEG compression device 114. As apparent from FIG. 4, each quantization table has 64 quantization parameters in 8×8 matrix alignment. The 64 quantization parameters are defined as $P_{ij}$ ($1 \leq i \leq 8$, $1 \leq j \leq 8$) in which i represents the column and j represents the row. Thus, in look-up table 401, $P_{23}=13$.

The effective field video signal 208 is applied to the JPEG compression device 114, which applies the compression algorithm defined in "DCT based systems" in the "Draft (Revision 6) of the JPEG algorithm" (ISO/IEC, JTC1/SC2/WG8) of Jun. 24, 1990. During the processing of one field video signal, the same selected quantization table F from the loop-up table memory 113 is used repeated.

In the compression algorithm used by the JPEG compression device 114, the video signal of one field is divided into a plurality of blocks, each block containing 8×8 pixels. A discrete cosine transformation (DCT) operation is carried out by a DCT operation unit 114d one block at a time to produce 64 coefficients in 8×8 matrix alignment in frequency domain. The 64 coefficients are defined as $C_{ij}$ ($1 \leq i \leq 8$, $1 \leq j \leq 8$) in which i represents the column and j represents the row. The JPEG compression device 114 has a divider 114a for dividing $C_{ij}$ by $P_{ij}$ to obtain a reduced coefficients $C'_{ij}$. In other words, divider 114a carries out the following calculation:

$$C_{ij} \div P_{ij} = C'_{ij}.$$

Also, a rounder 114b is provided in the JPEG compression device 114 to eliminated the numbers below the decimal point in the quotient $C'_{ij}$ to produce rounded reduced coefficients $C''_{ij}$. Thus, many rounded reduced coefficients $C''_{ij}$ will be equal to zero, particularly at the right bottom corner portion of the 8×8 matrix alignment. Thus, when the rounded reduced coefficients $C''_{ij}$ are coded by a variable length coding unit 114c, also provided in the JPEG compression device 114, the total data length for the plain image and that for the complicated image will both have less than a limited length, such as 20 KB. Thus, the JPEG compression device 114 produces coded signal G having data length of approximately 20 KB, or less, for every field.

The DCT operation is carried out repeatedly for a number of blocks in one field, but using the same selected quantization table to process the video signal in one field. For processing the video signal of the next field, another selected quantization table is used, depending on the high frequency component strength Q produced from switch 111. An example of JPEG compression device 114 is disclosed in "DCT (discrete cosine transformation) based systems" in the "Draft (Revision 6) of the JPEG algorithm" (ISO/IEC, JTC1/SC2/WG8) of Jun. 24, 1990, which is herein incorporated by reference.

When the high frequency component strength Q is high, that field has a strong high spatial frequency component, meaning that the image of that field is not a plain image, but a complicated image. If the DCT processed video signal of this field with the complicated image is divided by the same quantization parameters $P_{ij}$ as those used for the field with a plain image, the dividends $C_{ij}$ will be high, but the divisors $P_{ij}$ will be relatively small, resulting in a larger coding size after compression. For example, when the high frequency component strength Q divided by $2^{15}$ is 40, and the signal is compressed using the quantization parameters in table 401, the compressed size will be approximately 20 KB, but if the high frequency component strength Q divided by $2^{15}$ is 96 and the signal is compressed using the quantization parameters in table 401, the compressed size will be approximately 30 KB.

Therefore, when the high frequency component strength Q is high, the number of the rounded reduced coefficients $C''_{ij}$ having a value equal to zero can be increased and eventually decreasing the data coded by the variable length coding unit 114c. This is accomplished by changing the quantization parameters $P_{ij}$ after every processing of one field signal in the JPEG compression device 114. Thus, when the high frequency component strength Q divided by $2^{15}$ is 96, a code size of approximately 20 KB can be obtained by data compression using the appropriate quantization parameters as shown in table 402.

The FIFO memory 102 supplies the effective field video signal 208 to the field memory 115 for temporary storing one field video signal. When the effective field video signal 208, delayed one vertical synchronization period by the field memory 115, is output, the vertical synchronization signal 202 applied to the JPEG compression device 114 rises. The effective field video signal 208 output by the field memory 115 is thus compressed by the JPEG compression device 114 using the quantization data from the selected quantization table F, and the compressed result is output as the compressed coded signal G.

Figure 5:
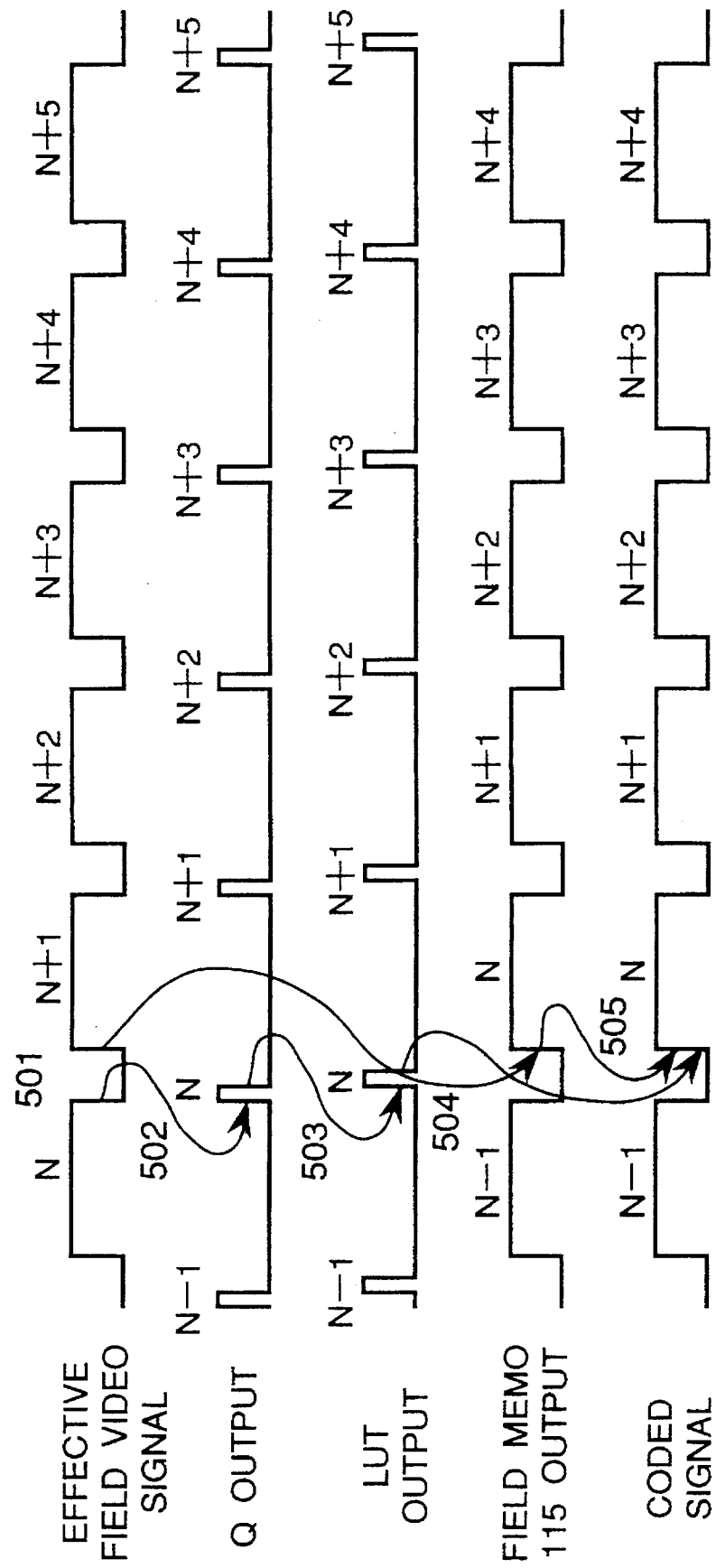
FIG. 5 is a timing chart of an operation of the apparatus of FIG. 1.

A timing chart for this operation is shown in FIG. 5.

At time 501, the $N^{th}$ effective field video signal 208 is output from the effective field extractor 101.

At time 502, the selector switch 111 switches and the high frequency component strength Q for the $N^{th}$ field is output from the cumulative memory 109.

At time 503, the quantization table F for the $N^{th}$ field is output from the look-up table memory 113 based on the high frequency component strength Q.

At time 504, the $N^{th}$ effective field video signal 208 delayed one vertical synchronization period is output from the field memory 115 simultaneous to the start of $N^{th}+1$ effective field video signal 208 output from the effective field extractor 101.

At time 505, the $N^{th}$ effective field video signal 208 is compressed by the JPEG compression device 114 using the $N^{th}$ quantization table data F, and the result is output as the $N^{th}$ compressed coded signal G.

By thus extracting the area containing the actual field image from the NTSC signal by means of the effective field extractor 101, calculating the high frequency component strength Q using the FIFO memory 102 and other components, obtaining the quantization table data F from the look-up table memory 113, and assuring a proper correlation between the field and the quantization table data F by means of the field memory 115, a digital video signal code size control apparatus according to the first embodiment of the invention is able to compress in real-time a continuously input NTSC signal stream field by field within a desired block size.

A second embodiment of a digital video signal code size control apparatus according to the invention is described below with reference to the block diagram shown in FIG. 6.

Figure 6:
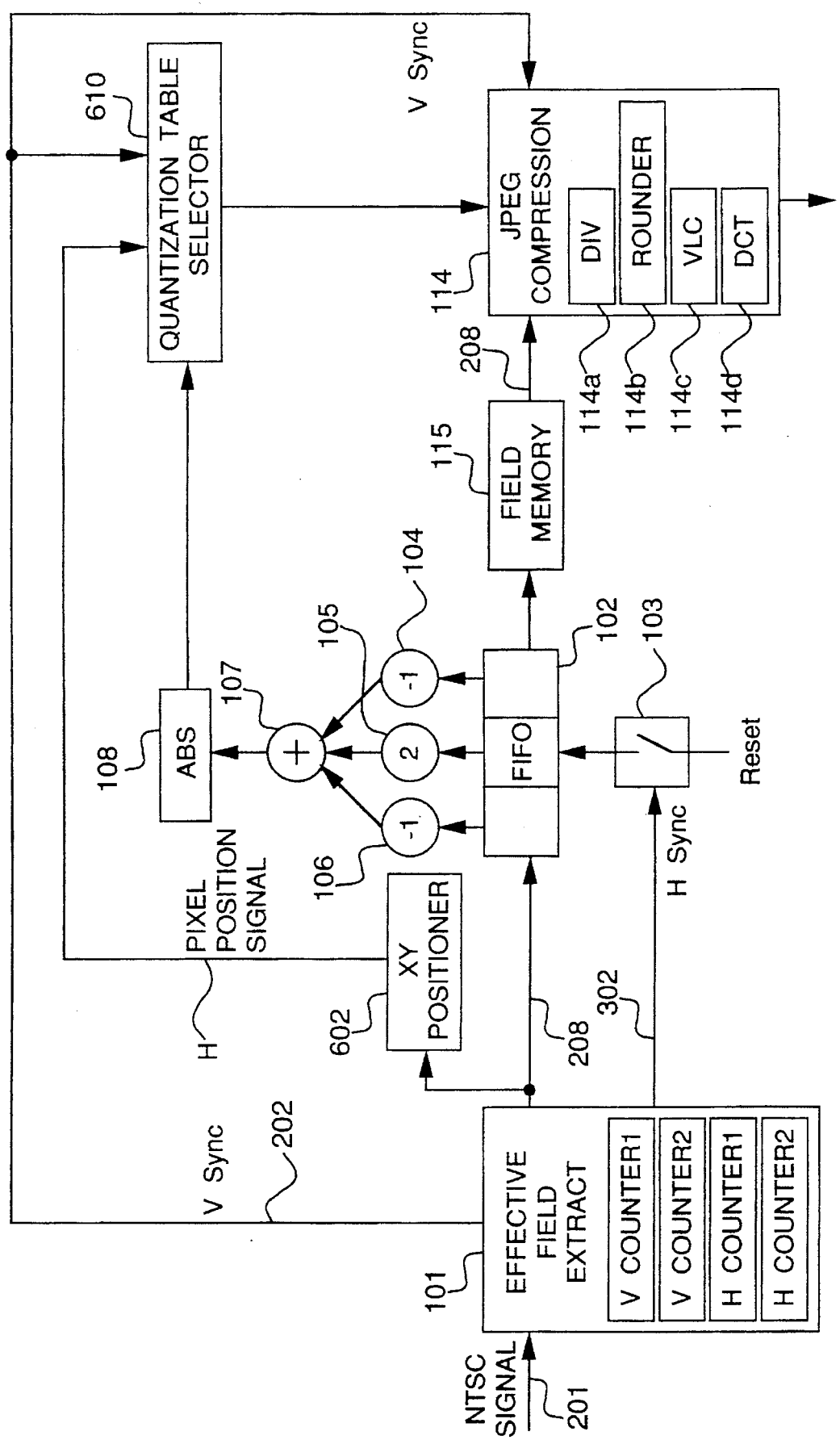
FIG. 6 is a block diagram of the digital video signal code size control apparatus according to the second embodiment of the present invention.

As shown in FIG. 6, the NTSC input signal 201 is input to the effective field extractor 101, which extracts the effective field signal 208, which is the component of the NTSC input signal 201 containing the actual video data. Note that this effective field extractor 101 is identical to that described in the first embodiment above. The effective field video signal 208 extracted from the NTSC input signal 201 by the effective field extractor 101 comprises 240 lines/field at 640 dots/line. Note also that each pixel comprises the luminance element only, and is expressed by eight bits.

According to the second embodiment, the effective field video signal 208 is output to the FIFO memory 102 and also to an effective pixel XY positioner 602.

When the effective field video signal 208 is input to the XY positioner 602, the coordinates (X, Y) of the current pixel are output, in which X is a value between 1 and 640 in the X axis and Y is a value between 1 and 240 in the Y axis. This pixel coordinate data (X, Y) is output as pixel position signal H.

The reset switch 103 resets (is ON) when the horizontal synchronization signal 302 is HIGH to clear the FIFO memory 102. The FIFO memory 102 temporarily stores three consecutive pixels from the effective field video signal 208 for each scanning line. Each of the pixel values in the FIFO memory 102 is multiplied by the coefficients 104,105 and 106, and the products are summed by the adder 107. The absolute value of the adder 107 output is then obtained by the absolute value extractor 108 and applied to a quantization table selector 610. The quantization table selector 610 outputs the quantization table F based on the absolute value extractor 108 output, the vertical synchronization signal 202, and the pixel position signal H.

Figure 7:
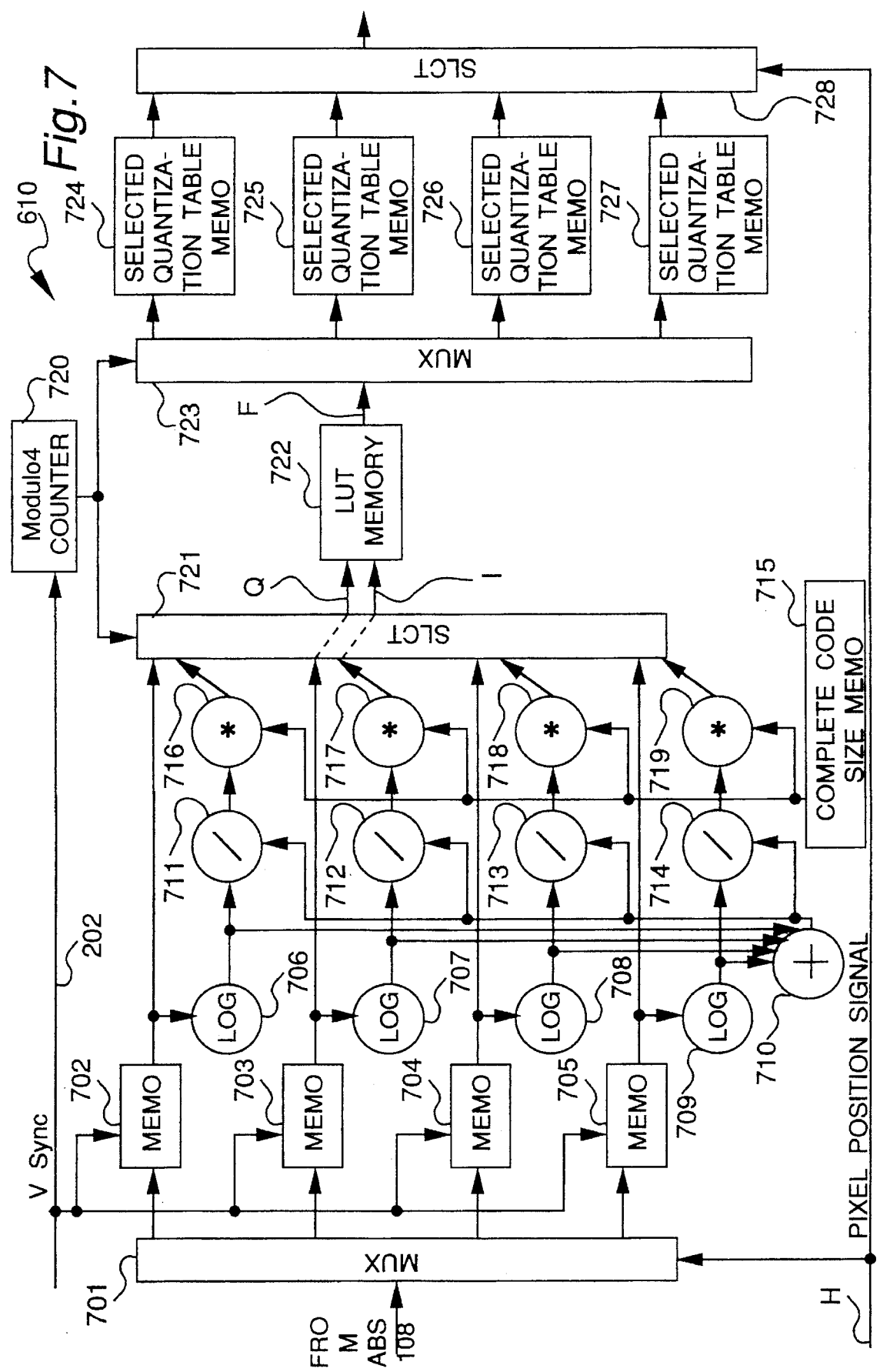
FIG. 7 is a detailed block diagram of the look-up table selector shown in FIG. 6.

A detailed block diagram of the quantization table selector 610 is shown in FIG. 7.

Referring to FIG. 7, the output from the absolute value extractor 108 and the pixel position signal H are input to a multiplexer 701, which distributes the output from the absolute value extractor 108 to four cumulative memories 702, 703, 704 and 705 according to the pixel position signal H. The vertical synchronization signal 202 is also input to the cumulative memory 702, 703, 704 and 705 and to the modulo 4 counter 720. The output of the absolute value extractor 108 is assigned to one of the memories as follows.

If the coordinates of the pixel position signal H are in ($1 \leq X \leq 320$) and ($1 \leq Y \leq 120$), i.e., in the top left quarter of the field image, the pixel position signal H is input to the first cumulative memory 702; if in ($321 \leq X \leq 640$) and ($1 \leq Y \leq 120$), i.e., in the top right quarter of the field image, to the second cumulative memory 703; if in ($1 \leq X \leq 320$) and ($121 \leq Y \leq 240$), i.e., in bottom left quarter of the field image, to the third cumulative memory 704; and if in ($321 \leq X \leq 640$) and ($121 \leq Y \leq 240$), i.e., in bottom right quarter of the field image, to the fourth cumulative memory 705.

Figure 8:
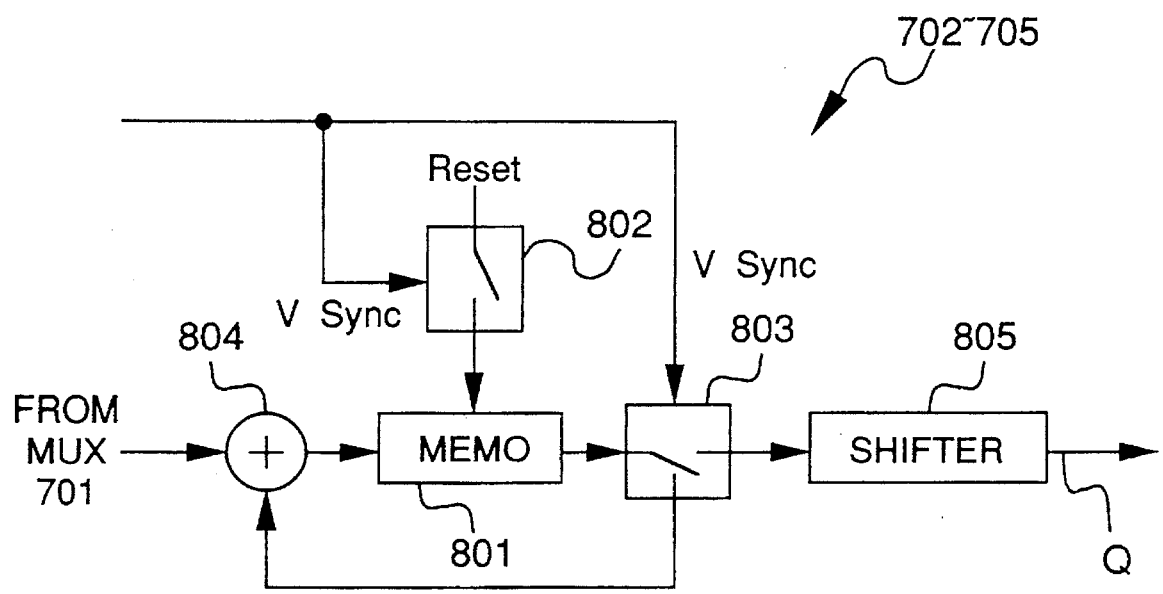
FIG. 8 is a detailed block diagram of the cumulative memory shown in FIG. 7.
Figures 10, 11:
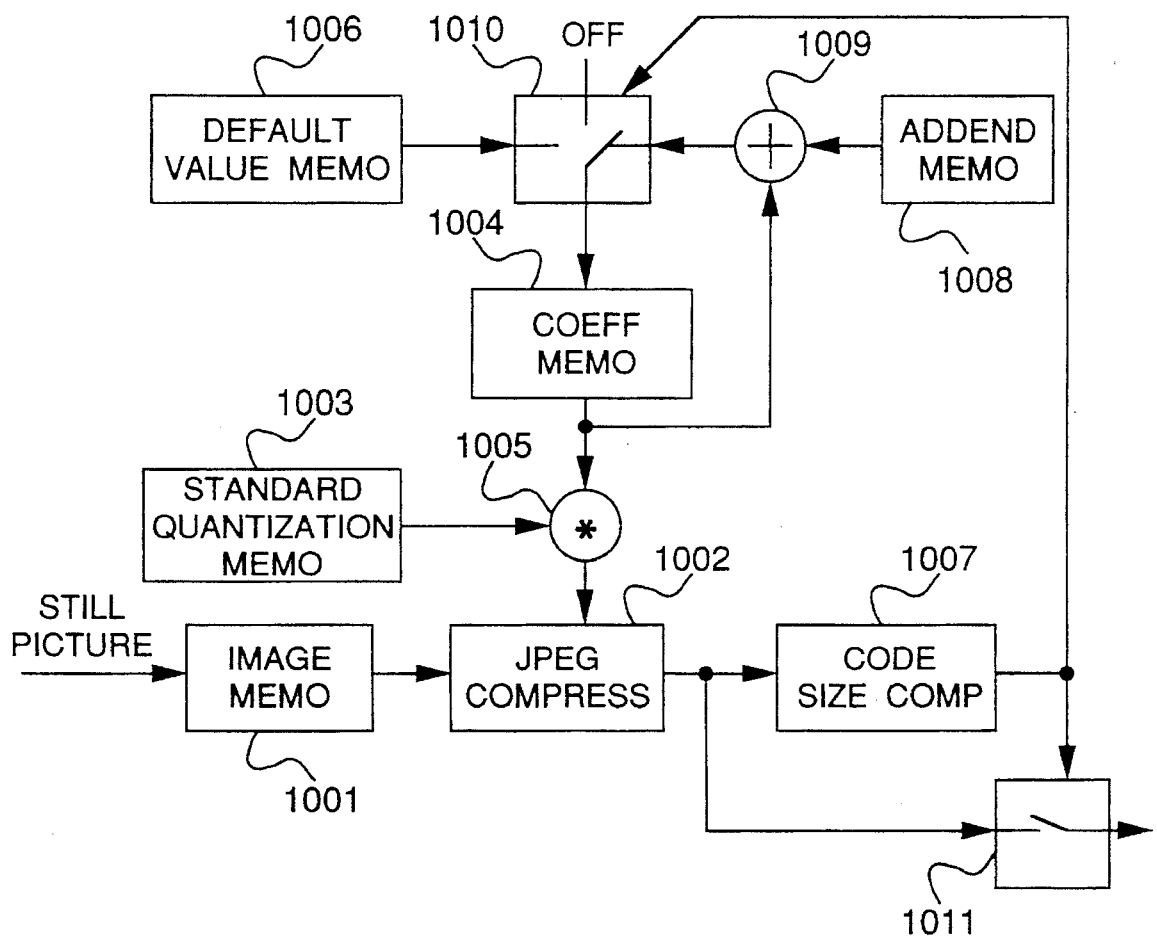
FIG. 10 is a block diagram of a conventional digital video signal code size control apparatus.
FIG. 11 is a diagram showing sample contents of the standard look-up table memory in FIG. 10.

Each of the cumulative memories 702–705 has a structure shown in FIG. 8.

Referring to FIG. 8, the output of the absolute value extractor 609 is applied through the multiplexer 701 to an adder 804 for accumulation in the cumulative memory 801. The value of the cumulative memory 801 is cleared to zero by a reset switch 802 at the rising edge of the vertical synchronization signal 202. Selector switch 803 switches to the adder 804 when the vertical synchronization signal 202 is LOW, and switches to produce the contents of the cumulative memory 801 from the cumulative memory when the vertical synchronization signal 202 is HIGH. The contents of the cumulative memory 801 produced from the selector switch 803 is shifted thirteen bits right by a shifter 805. The bit-shifted signal is the output of the cumulative memory representing the high frequency component strength Q for a corresponding quarter field image area.

Referring back to FIG. 7, the common logarithms of the outputs of the first, second, third, and fourth cumulative memory 702, 703, 704 and 705 are then obtained by corresponding logarithm operators 706, 707, 708 and 709, respectively. The common logarithms are then added by an adder 710, and the logarithm sum is output to each of dividers 711, 712, 713 and 714.

The first logarithm operator 706 output is also input to the first divider 711 and divided by the output of the adder 710. The outputs of the other logarithm operators 707, 708 and 709 are similarly input to the corresponding dividers 712, 713 and 714 and divided by the output from the adder 710. As a result, the outputs of the dividers 711, 712, 713 and 714 express the ratio of each logarithm operator output to the sum of the outputs of the logarithm operators 706, 707, 708 and 709.

The predetermined target block size for the complete field is stored in the complete code size memory 715.

The output of the first divider 711 is multiplied by the output from the complete code size memory 715 by a first multiplier 716. The product I thus distributes the target block size of the overall field according to the ratio of the logarithm of the partial image high frequency component strength Q. This value becomes the target block size during compression of the corresponding partial image, and is referred to below as the "partial image target block size."

The output of the second divider 712 is similarly multiplied by the complete code size memory 715 output by the second multiplier 717, the output of the third divider 713 is multiplied by the output of the complete code size memory 715 by the third multiplier 718, and the output of the fourth divider 714 is multiplied by the complete code size memory 715 output by the fourth multiplier 719, thus obtaining the partial image target block size I for each of the corresponding partial images.

The modulo 4 counter 720 counts from 0 to 3 at high speed while the vertical synchronization signal value is HIGH.

When the modulo 4 counter 720 output is "0", the selector 721 selects and outputs the outputs of the first cumulative memory controller 702 and the first multiplier 716; when "1", the selector 721 selects and outputs the outputs of the second cumulative memory controller 703 and the second multiplier 717; when "2", the outputs of the third cumulative memory controller 704 and the third multiplier 718; and when "3", the outputs of the fourth cumulative memory controller 705 and the fourth multiplier 719. The selected partial image outputs are thus sequentially input to the look-up table memory 722 which stores a plurality of look-up tables carrying different quantization data. Of the plurality of look-up tables stored in the look-up table memory 722, one look-up table is selected by using the partial image high frequency component strength Q and the partial image target block size I as the address data. The contents of the look-up table memory 722 are shown in part in FIG. 9.

It is assumed in the following description that the partial image high frequency component strength Q for the top left image quadrant and the bottom left image quadrant of the field is 40, the partial image high frequency component strength Q for the top right image quadrant and the bottom right image quadrant of the field is 96, and the target block size for the complete field stored in the complete code size memory 715 is 18 KB. The partial image target block size for each of the partial image areas assuming these parameters is approximately 4 KB for the left top and bottom quadrants, and approximately 5 KB for the right top and bottom quadrants.

When the modulo 4 counter 720 output is 0 with the partial image high frequency component strength Q value being 40 and the partial image target block size I being 4 KB, the look-up table memory 722 selects and produces selected data F which is, in this case, quantization table 901. The selected quantization table 901 is transmitted through multiplexer 723 and stored in a selected quantization table 724.

Similarly, when the modulo 4 counter 720 output is 1, 2, and 3, the look-up table memory 722 accordingly selects and produces quantization tables 904, 901, and 904, respectively. The selected quantization tables 904, 901, and 904, respectively, are transmitted through multiplexer 723 and stored in selected quantization table memory 725, 726 and 727. The multiplexer 723 passes the selected data F to the selected quantization table memory 724, 725, 726, and 727, respectively, when the modulo 4 counter 720 output is 0, 1, 2, and 3.

The selector 728 in turn outputs the quantization table parameters from the first selected quantization table memory 724 as the output of the quantization table selector 610 when the coordinates of the pixel position signal H are ($1 \leq X \leq 320$) and ($1 \leq Y \leq 120$); the quantization table parameters from the second selected quantization table memory 725 when the coordinates are ($321 \leq X \leq 640$) and ($1 \leq Y \leq 120$); the parameters from the third selected quantization table memory 726 when the coordinates are ($1 \leq X \leq 320$) and ($121 \leq Y \leq 240$); and the parameters from the fourth selected quantization table memory 727 when the coordinates are ($321 \leq X \leq 640$) and ($121 \leq Y \leq 240$).

Referring back to FIG. 6, the effective field video signal 208 is compressed by the JPEG compression device 114 in the same manner described above in connection with FIG. 1.

As a result, a digital video signal code size control apparatus according to this second embodiment of the invention is able to compress in real-time a continuously input NTSC signal stream field by field within a fixed block size even when there is a bias in the spatial high frequency component of the current field after the area containing the actual field image is extracted from the NTSC signal by means of the effective field extractor 101 by calculating the partial image high frequency component strength Q using the FIFO memory 102 and other components, allocating the appropriate partial image high frequency component strength Q according to the computed ratio, obtaining an appropriate quantization table F enabling that partial image to be compressed to within a partial image target block size I from the look-up table memory 722, and assuring a proper correlation between the field and the quantization table data F by means of the field memory 115.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital video signal code size control apparatus for encoding a signal, comprising:

field memory means for storing at least a field of said video signal;

high frequency component measuring means for measuring a high frequency component strength of an image carried in said video signal, the high frequency component measuring means including:

pixel memory means for storing a predetermined number of consecutive pixels;

weighting means for weighting said pixels stored in said pixel memory means by a plurality of predetermined weighting values and for producing weighted values;

adding means for adding said weighted values and for producing a sum;

quantization parameter generation means for generating selected quantization parameters, prior to encoding said video signal, based on said high frequency component strength; and coding means for encoding said video signal in said field memory means using said selected quantization parameters to generate coded video signal of one field within a preselected data length, wherein said quantization parameter generation means comprises a look-up table memory carrying a plurality of look-up tables, each table containing a plurality of quantization parameters $P_{ij}$ in a matrix format in which i represents a column and j represents a row, said high frequency component strength being used as an address for selecting a look-up table.

2. A digital video signal code size control apparatus as claimed in claim 1, wherein said high frequency component measuring means further comprises:

absolute taking means for taking an absolute value of said sum; and accumulation means for accumulating said absolute value of the sums, said accumulated sums being produced as said high frequency component strength.

3. A digital video signal code size control apparatus as claimed in claim 1, wherein said coding means comprises a JPEG compression means.

4. A digital video signal code size control apparatus as claimed in claim 3, wherein said JPEG compression means comprises:

discrete cosine transformation operation means for producing a plurality of coefficients $C_{ij}$ in a matrix format in which i represents a column and j represents a row;

divider means for dividing said coefficients $C_{ij}$ by corresponding quantization parameters $P_{ij}$ to obtain a reduced coefficients $C'_{ij}$;

rounder means for eliminating the numbers below the decimal point in the reduced coefficients $C'_{ij}$ to produce rounded reduced coefficients $C''_{ij}$; and variable length coding means for encoding said rounded reduced coefficients $C''_{ij}$.

5. A digital video signal code size control apparatus as claimed in claim 1, further comprising data dividing means for dividing said video signal of one field into video signal of a plurality of sections, and wherein said high frequency component measuring means and said quantization parameter generation means are provided for each of said sections.

6. A digital video signal code size control apparatus as claimed in claim 5 further comprising a coding size allocation unit for allocating a target coding size to each section based on said high frequency component strength of said section.

* * * * *